United States Patent
Hu

(10) Patent No.: US 11,097,697 B2
(45) Date of Patent: Aug. 24, 2021

(54) PLUGGABLE TWO-WAY TIRE SLIP STOPPER

(71) Applicant: Qingdao Runbell Co., Ltd, Shandong (CN)

(72) Inventor: Lijun Hu, Shandong (CN)

(73) Assignee: Qingdao Runbell Co., Ltd, Shandong (CN)

( * ) Notice: Subject to any disclaimer, the term of this patent is extended or adjusted under 35 U.S.C. 154(b) by 272 days.

(21) Appl. No.: 16/244,038

(22) Filed: Jan. 9, 2019

(65) Prior Publication Data
US 2020/0216043 A1    Jul. 9, 2020

(51) Int. Cl.
*B60T 3/00* (2006.01)

(52) U.S. Cl.
CPC ...................... *B60T 3/00* (2013.01)

(58) Field of Classification Search
CPC .... B60T 3/00; B66F 7/24; B66F 7/243; B64F 1/16; B60P 3/077
USPC ......................................... 188/4 R; D12/217
See application file for complete search history.

(56) References Cited

U.S. PATENT DOCUMENTS

| | | | |
|---|---|---|---|
| 9,183,423 B2* | 11/2015 | Batcho, Sr. ........ | G06K 7/10316 |
| 2005/0077121 A1* | 4/2005 | Chrisco .................... | B60T 3/00 188/32 |
| 2005/0132511 A1* | 6/2005 | Berg ...................... | B66F 7/243 14/69.5 |
| 2006/0011422 A1* | 1/2006 | Chrisco .................... | B60T 3/00 188/5 |
| 2014/0325770 A1* | 11/2014 | Somers ................... | B66F 7/243 14/69.5 |
| 2015/0028101 A1* | 1/2015 | Batcho, Sr. .......... | H01Q 1/2241 235/439 |
| 2018/0029856 A1* | 2/2018 | Muth ...................... | B66F 7/243 |

FOREIGN PATENT DOCUMENTS

DE    20 2014 102 233    *    6/2015    ................ B60T 3/00

OTHER PUBLICATIONS

Machine translation of DE 20 2014 102 233 (no date).*

* cited by examiner

*Primary Examiner* — Nicholas J Lane
(74) *Attorney, Agent, or Firm* — Houtteman Law LLC

(57) ABSTRACT

The utility model relates to a pluggable two-way tire slip stopper, which is used for solving the problem of sliding when a vehicle is parked. The pluggable two-way tire slip stopper includes two slip stoppers, the back portions of the two slip stoppers are plugged together via a slot in a protrusion manner, the two slip stoppers are identical in structure, and the slip stopper includes the anti-slip portion of a front end and the plug portion of a rear end, the anti-slip portion is integrally formed with the plug portion, the plug portion is in the shape of a square, the plug portion is a triangular column shape with an obliquely upward surface, and the anti-slip portion is provided with a plurality of anti-slip belts, and the anti-slip belt is disposed at a certain distance, the upper surface of the anti-slip belt is inclined, and the anti-slip belt is provided thereon with a plurality of anti-slip protruding strips. The two slip stoppers of the utility model can be combined and plugged together, can be used in combination, and uses a two-wheeled vehicle to prevent slippage, whose effect is very good. The utility model has the advantages of scientific design, convenient use and good use value. The utility model is light and durable, convenient to carry, safe and convenient.

11 Claims, 3 Drawing Sheets

PLUGGABLE TWO-WAY TIRE SLIP STOPPER

TECHNICAL FIELD

The utility model relates to a pluggable two-way tire slip stopper, which is used for solving the problem of sliding when a vehicle is parked.

TECHNICAL BACKGROUND

As people's living standards improve, a car is used more and more widely as a mobile tool. A tire slip stopper is also known as tire locator, a wheel slip stopper, and a car slip stopper and is usually made of high-strength rubber or polymer plastic, the slip stopper is mainly used when the car is parked and placed between the wheel and the ground, and can effectively prevent the car from slipping back, especially when the car is parked if the driver is not in the cab when the road conditions are not good, which can effectively improve driving safety. According to the 2013 new traffic safety manual, ramp parking must use a triangular object to fix the wheels. However, for a two-wheeled vehicle, the ordinary slip stopper is not suitable, and cannot effectively stop slipping by only a single slip stopper.

SUMMARY OF THE INVENTION

The technical problem to be solved by the utility model is how to overcome the deficiencies of the background art and provide a pluggable two-way tire slip stopper.

The technical solution adopted by the utility model to achieve the above object is: a pluggable two-way tire slip stopper includes two slip stoppers, wherein the back portions of the two slip stoppers are plugged together via a slot in a protrusion manner, the two slip stopper are identical in structure, the slip stopper comprises the anti-slip portion of a front end and the plug portion of a rear end, the anti-slip portion is integrally formed with the plug portion, the plug portion is in the shape of a square, and the anti-slip portion is a triangular column shape with an obliquely upward surface, the anti-slip portion is provided with a plurality of anti-slip belts, the anti-slip belts are disposed at a certain distance, the upper surface of the anti-slip belt is inclined, and the anti-slip belt is provided thereon with a plurality of anti-slip protruding strips.

Further, each the two anti-slip belts are a groove therebetween, and the groove is provided therein with a plurality of longitudinal partitions, the height of the partition matches the anti-slip belt.

Further, the number of the anti-slip belts is three and the number of the grooves is two.

Further, the groove extends rearward to the plug portion, the front end of the groove is provided with a connecting portion, and the connecting portion is connected with the anti-slip belts on both sides.

Further, the groove is provided with a bottom, and the bottom is provided with a plurality of holes.

Further, the bottom of the groove is further provided with an anti-slip mat, the anti-slip mat is mounted on the hole.

Further, the number of the longitudinal partitions in each of the grooves is three.

Further, the back portion of the plug portion is provided with the slot and a protrusion, and the number of the card slot and the protrusion is both two, the slot and the protrusion can be matched in structure, and a locking and positioning buckle is installed on the slot and the surface of the protrusion.

Further, the anti-slip belt is provided thereon with a plurality of anti-slip protruding strips, and the longitudinal protruding strips are uniformly disposed on the anti-slip belt at a certain distance.

Further, the anti-slip belt is provided therein with a plurality of support plates spaced apart by a distance, and the anti-slip belt is bottomless.

The side faces of the above-mentioned slip stopper are provided with side holes, and the side holes mainly serve to facilitate carrying.

The two slip stoppers of the utility model can be combined and plugged together, can be used in combination, and uses a two-wheeled vehicle to prevent slippage, whose effect is very good. The utility model has the advantages of scientific design, convenient use and good use value. The utility model is light and durable, convenient to carry, safe and convenient.

BRIEF DRAWINGS OF THE INVENTION

DETAILED DESCRIPTION

Hereinafter, the utility model will be described in detail with reference to the accompanying drawings.

Figure 1:
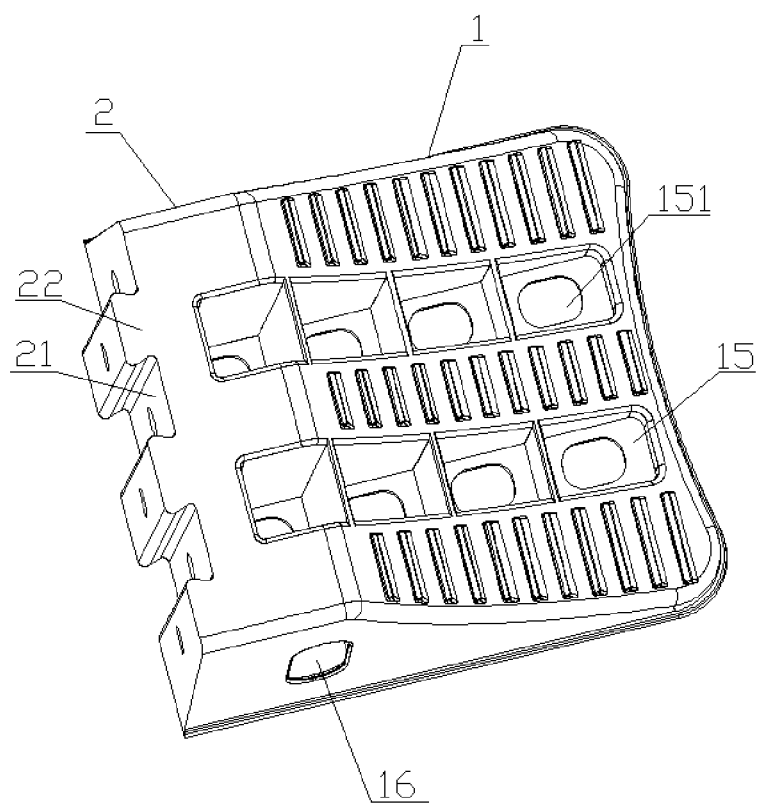
FIG. 1 is a view of a structure of a slip stopper of the present invention
Figure 2:
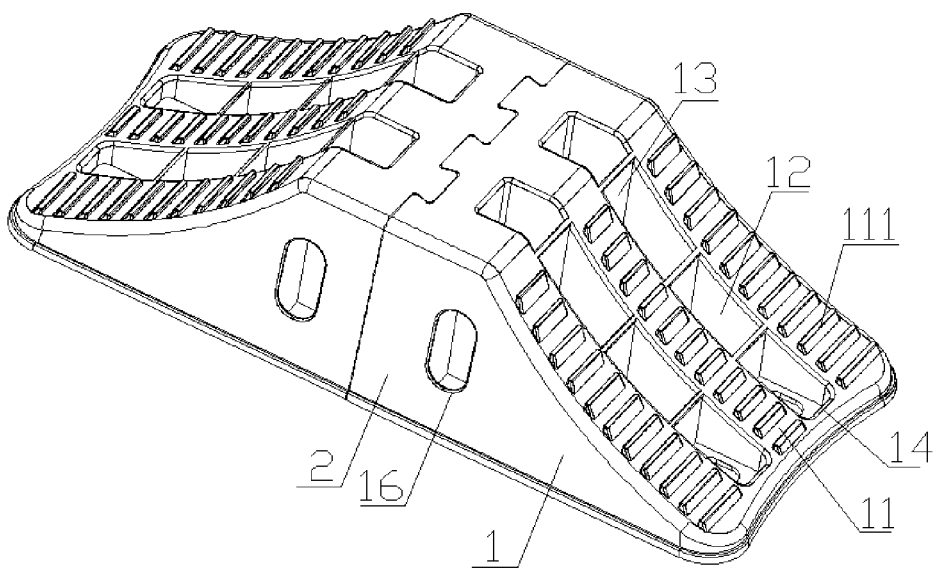
FIG. 2 is a view showing a combined structure of a slip stopper of the present invention.
Figure 3:
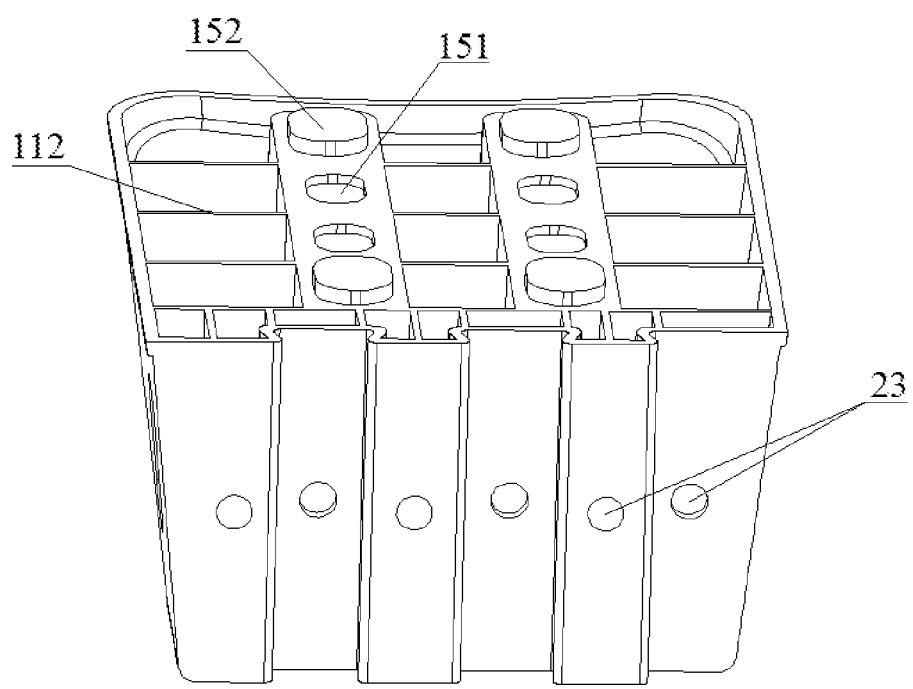
FIG. 3 is a view showing a structure of a bottom of a slip stopper of the present invention.

As shown in FIGS. 1, 2, and 3, a pluggable two-way tire slip stopper includes two slip stoppers, the back portions of the two slip stoppers are plugged together via a slot in a protrusion manner, to form a two-way slip stopper for easy use in a car with a two-wheel structure. The slip stopper can also be used alone or used as a general slip stopper.

For the scientific and reasonable design, the above two slip stoppers are identical in structure. The construction of the above-described slip stopper will be specifically described below in order to disclose the present embodiment well.

The above-mentioned slip stopper includes the anti-slip portion 1 of a front end and a plug portion 2 of a rear end. For the convenience of manufacture, the anti-slip portion 1 and the plug portion 2 are integrally formed. The above-mentioned plug portion 2 has a square structure as a whole, and the anti-slip portion 1 has a three-column structure, the side faces of the three-column structure face downward, and a slope of a triangular prism faces upward.

The upwardly inclined surface of the above-mentioned anti-slip portion 1 is provided with three anti-slip belts 11, and the three anti-slip belts 11 are spaced apart by a certain distance, the three anti-slip belts 11 are provided with a groove 12 therebetween, and the above structure causes the grooves 12 to be two. The above-mentioned groove 12 is deep to the bottom, and the bottom is flush with the bottom of the plug portion 2. In order to ensure that the groove 12 is not deformed, a force is uniform, and a longitudinal partition 13 is disposed in the groove 12, each of the grooves 12 is provided with three longitudinal partitions 13, and the height of the longitudinal partition 13 is matched with the anti-slip belts 11 on both sides.

It is further explained that the above-mentioned groove 12 extends rearward to the middle of the plug portion 2, and the groove 12 has a front portion extending forward to the front end of the anti-slip portion 1. The front end of the groove 12 is provided with a connecting end 14, and the left and the right of the connecting end 14 are integrally connected to the anti-slip belt 11 in an integrated structure.

Further, a plurality of anti-slip protruding strips 111 are disposed on the inclined surface of the three anti-slip belts 11, and the protruding strips are triangular in cross section, and the anti-slip protruding strips 111 are evenly disposed at an oblique surface of the anti-slip belt 111 at a certain distance. the above can achieve a better anti-slip effect.

In the above-mentioned groove 12, the groove 12 is provided with a bottom 15 which is provided with a plurality of holes 151 for promoting drainage and preventing backlog of water. Further, the lower end of the hole 151 is provided with a anti-slip mat 152, which prevents slippage of the structure of the utility model.

The slip stopper of the utility model can be used alone or in combination, and the specific combination scheme is as follows:

Two structurally identical slip stoppers can be combined by a combination of the plug portions. Specifically, the back portion of the plug portion 2 is provided with the slot 21 and a protrusion 22, and the height of the slot 21 and of the protrusion 22 coincides with the height of the plug portion 2.

Moreover, a locking and positioning buckle 23 is disposed on the surfaces of the slot 21 and the protrusions 22, the locking and positioning buckle 23 is also realized by combining the slot and the protrusion.

The above-mentioned structure of the slot 21 and the protrusion 22 can be matched, which makes the groove and the protrusion interleaving of the two structurally identical slip stoppers finally combined, and the combination is strict and firm. Preferably, the number of the above-mentioned grooves 21 and of the protrusions 22 is two.

Further, the side faces of the above-mentioned slip stopper are provided with side holes 16 to achieve the carrying effect. The anti-slip belt 11 is hollow inside and is provided with a plurality of support plates 112 spaced apart by a certain distance. The anti-slip belt 11 is bottomless, which saves material while being strong and firm. Moreover, the inside of the plug portion 2 is also hollow, which is light, convenient, stable and durable.

Finally, when the utility model is used, the slip stopper can be directly prevented at a tire, or the two slip stoppers can be combined and placed in the middle position of the bidirectional tire, which is very convenient to use.

The above embodiment is only for the purpose of illustrating the concept and features of the present invention and is intended to enable those skilled in the art to understand the utility model and to implement the utility model but not restrict the scope of protection of the utility model. Equivalent changes or modifications made in accordance with the spirit of the invention are intended to be included within the scope of the invention.

The invention claimed is:

1. A pluggable two-way tire slip stopper, comprising: two slip stoppers, wherein back portions of the two slip stoppers are plugged together, the two slip stopper are identical in structure, each of the two slip stoppers has an anti-slip portion at a front end thereof and a plug portion at a rear end thereof, the anti-slip portion is integrally formed with the plug portion, the plug portion is of a rectangular shape, and the anti-slip portion is a of a triangular column shape with an obliquely upward surface, the anti-slip portion is provided with a plurality of anti-slip belts, the anti-slip belts are disposed at a certain distance, the upper surface of the anti-slip belt is inclined, and the anti-slip belt is provided thereon with a plurality of anti-slip protruding strips;

wherein each two adjacent anti-slip belts of the plurality of anti-slip belts has a groove formed therebetween, and the groove is provided therein with a plurality of longitudinal partitions, the height of the longitudinal partition matches the anti-slip belt;

wherein the groove is provided with a bottom, and the bottom is provided with a plurality of holes; and wherein the bottom of the groove is further provided with an anti-slip mat, the anti-slip mat is mounted on the hole, and the anti-slip mat is made of rubber material.

2. The pluggable two-way tire slip stopper according to claim 1, wherein the number of the anti-slip belts is three and the number of the grooves is two.

3. The pluggable two-way tire slip stopper according to claim 1, wherein the groove extends rearward to the plug portion, the front end of the groove is provided with a connecting portion, and the connecting portion is connected with the anti-slip belts on both sides.

4. The pluggable two-way tire slip stopper according to claim 1, wherein the number of the longitudinal partitions in each of the grooves is three.

5. The pluggable two-way tire slip stopper according to claim 1, wherein each back portion of the two slip stoppers is provided with at least one slot and at least one protrusion, and the at least one slot and the at least one protrusion of the two slip stoppers can be engaged with each other, and a locking and positioning buckle is installed on the at least one slot and a surface of the at least one protrusion.

6. The pluggable two-way tire slip stopper according to claim 1, wherein the anti-slip protruding strips of the anti-slip belt are uniformly disposed at a certain distance.

7. The pluggable two-way tire slip stopper according to claim 1, wherein the anti-slip belt is provided therein with a plurality of support plates spaced apart by a distance, and the anti-slip belt is bottomless.

8. The pluggable two-way tire slip stopper according to claim 2, wherein the groove is provided with a bottom, and the bottom is provided with a plurality of holes.

9. The pluggable two-way tire slip stopper according to claim 8, wherein the bottom of the groove is further provided with an anti-slip mat, the anti-slip mat is mounted on the hole, and the anti-slip mat is made of rubber material.

10. The pluggable two-way tire slip stopper according to claim 6, wherein the each of the plurality of anti-slip belts is provided therein with a plurality of support plates spaced apart by a distance, and the anti-slip belts are bottomless.

11. The pluggable two-way tire slip stopper according to claim 5, wherein each back portion of the two slip stoppers is provided with two slots and two protrusions.

* * * * *